July 9, 1968 M. S. COHEN 3,392,232

FACSIMILE TRANSMISSION SYSTEM

Filed Sept. 14, 1964 3 Sheets-Sheet 3

United States Patent Office 3,392,232
Patented July 9, 1968

3,392,232
FACSIMILE TRANSMISSION SYSTEM

Milton S. Cohen, Arlington, Mass., assignor, by mesne assignments, to Arthur D. Little, Inc., Cambridge, Mass., a corporation of Massachusetts Filed Sept. 14, 1964, Ser. No. 396,336
15 Claims. (Cl. 178—6)

ABSTRACT OF THE DISCLOSURE

Apparatus for producing an acoustic tone representative of facsimile data, transmitting the tone, and transforming the received tone into an electrical signal for reproducing a copy of an original document on electrosensitive paper.

This invention relates to facsimile transmission systems and, more particularly, to a system for transmitting facsimile data acoustically by telephone.

It has heretofore been proposed that standard telephones, which are available at almost any place, would be exceptionally well suited for use in the facsimile transmission of documents (see Bartholomew Patent No. 1,454,719 and Finch Patent No. 2,047,863). Specialized facsimile equipment, which must be physically connected to and installed as part of a telephone system, is presently available. To date, however, no one has developed a commercially feasible, portable facsimile transmission system which may be directly used with any existing telephone. The major problem in the development of such a system has been the difficulty of providing a system having a sufficiently high degree of information integrity, in comparison to wired systems, without running afoul of the telephone company's general refusal to allow direct access to a subscriber by making electrical connection to their lines. It has also been difficult to provide, especially without any electrical connection, a simple and inexpensive means of synchronizing the transmitting and receiving mechanisms.

One of the objects of the present invention is to provide a compact and inexpensive system for transmitting facsimile data acoustically through standard telephone handsets and over ordinary telephone lines.

Another object is to provide a system of the type mentioned which will transmit facsimile data with a high degree of information integrity in comparison with a direct wired connection and which does not require any electrical connection to the telephone.

A further object is to provide a system of the type mentioned in which an alternating current carrier signal is amplitude modulated, transformed into a modulated acoustic tone which is directed into the mouthpiece of an ordinary telephone handset, transmitted to a distant telephone in the usual way, and transformed back into an electrical signal.

Still another object is to provide a system of the type mentioned in which a single amplitude modulated acoustic tone is used to transmit both the facsimile data and the synchronization signal.

Still further objects include providing novel electric circuits for use in systems of the type mentioned for sensing variation in the image on an original document and modulating the carrier signal in response to the sensed variations, increasing the modulation index of the received wave (by a factor of approximately 10), and insuring that the current utilized for producing a copy of the original on electrosensitive paper is linearly related to the input signal to the stylus drive system regardless of variations in the resistance of that paper.

The invention accomplishes the above-mentioned objects by providing a facsimile transmission system in which complete transmitting and receiving stations are designed to both be included in a single "portable typewriter sized" enclosure. The only electrical connection required is an ordinary A.C. power outlet. To transmit a facsimile using the invention, it is only necessary to wrap the original to be transmitted around a cylindrical drum, establish normal telephone contact with the person to whom the facsimile is to be transmitted, place the handset of the telephone into a recess in the equipment and throw a switch to the "transmit" position. The user at the receiving station need only set his switch in the "receive" position, wrap a sheet of receiving paper around a similar drum and place his handset in a similar recess. No electrical connection is required between the transmitter and receiver units. When transmitting, the unit senses variations in the image of the original, modulates a carrier wave in response to the sensed variation, changes the modulated carrier wave into an acoustic signal and directs this acoustic signal into the telephone handset. This signal is received at the receiving station where it is reconverted into an electrical signal and split into two portions. One portion is used to drive the receiving drum synchronously and the other is applied to the stylus to reproduce a copy of the original. Since the frequencies of the signals at the transmitting and receiving stations are exactly the same, the sending and receiving drums, being sensitive to frequency only, will always rotate synchronously.

For a complete understanding of the nature and objects of the present invention, reference is now made to the following detailed disclosure of a preferred embodiment thereof taken in conjunction with the accompanying drawings wherein.

Figure 2:
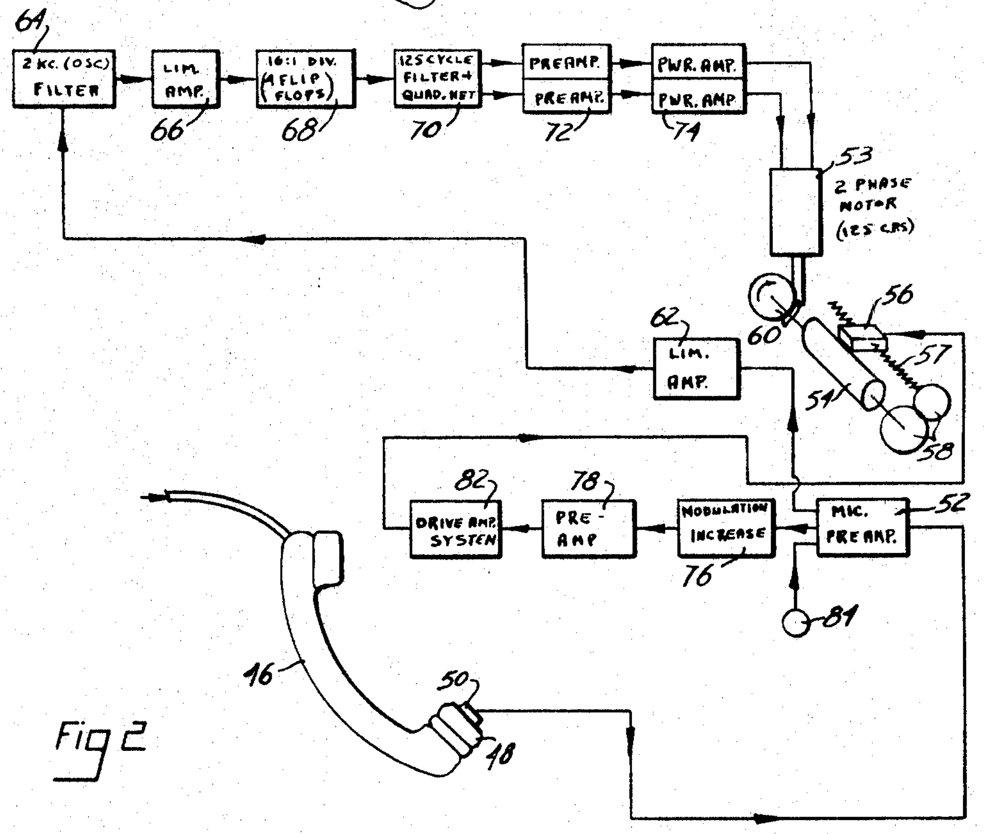
FIG. 2 is a schematic representation of a facsimile transmission system constructed according to the present invention in the receiving mode.
Figures 6A, 6B:
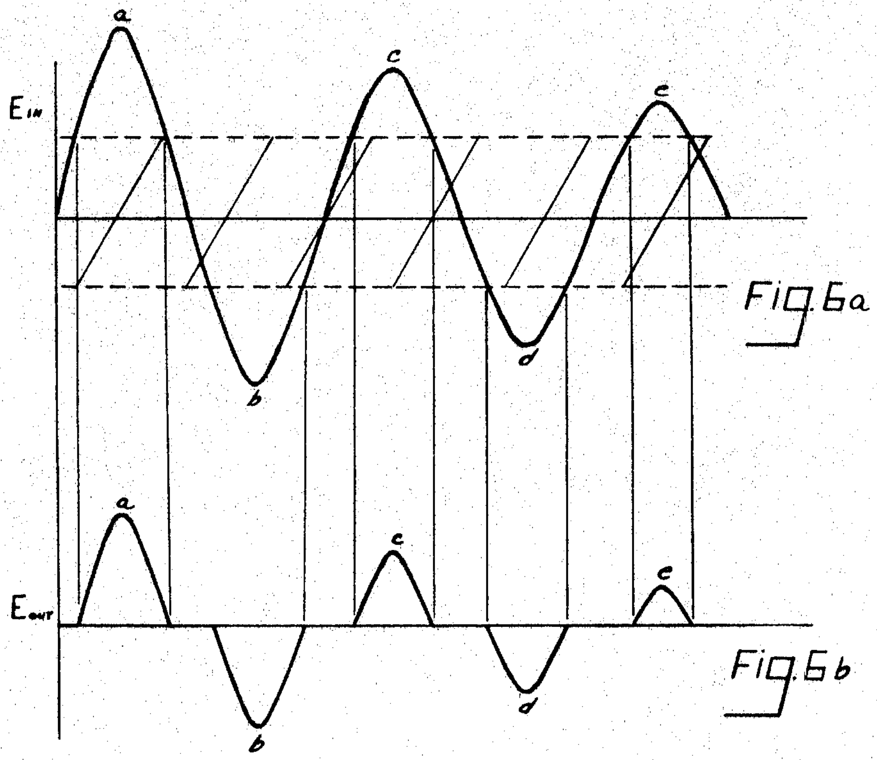
Figure 5:
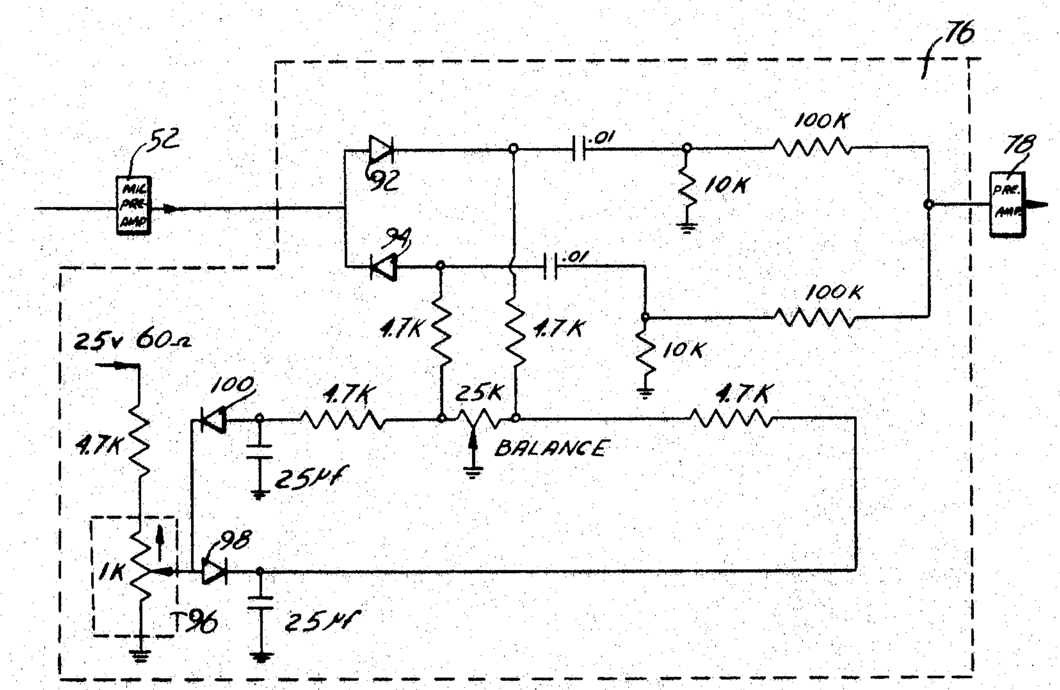
FIG. 5 is a schematic diagram of an electrical circuit used in the apparatus of FIG. 2 to increase the modulation index of the received signal.
Figure 7:
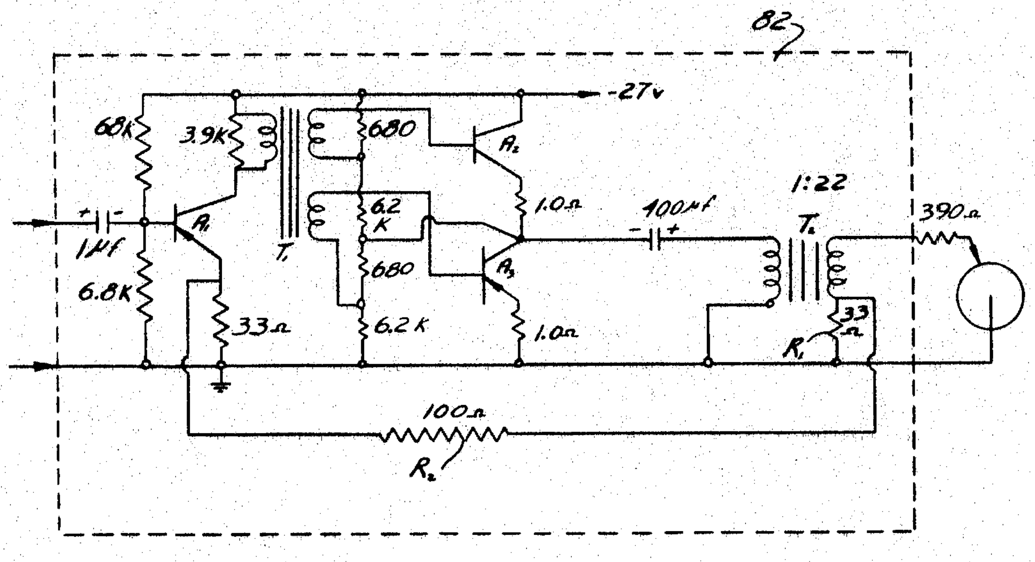

FIGS. 6*a* and 6*b* are wave forms illustrating the operation of the circuit of FIG. 5; and FIG. 7 is a schematic diagram of an electric circuit for driving the stylus system of the apparatus of FIG. 2.

Figure 1:
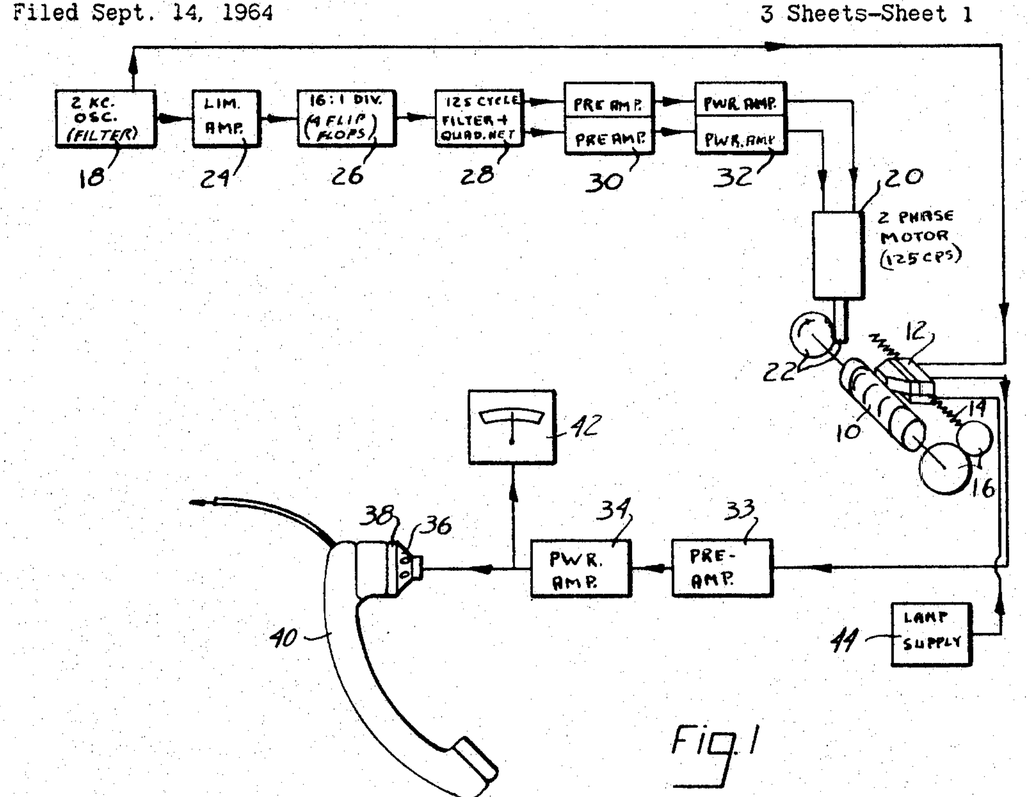
FIG. 1 is a schematic representation of a facsimile transmission system constructed according to the present invention in the transmit mode.

Reference is now made to FIG. 1 of the drawings wherein is illustrated apparatus comprising a preferred embodiment of the invention. The original document to be transmitted is wrapped around sending drum 10 and secured in place by a pair of garter springs or the like. A photoelectric sensor and electric lamp are contained in a scanning head 12 mounted on a screw 14 which is mounted parallel to the axis of drum 10. As drum 10 rotates at high speed, scanning head 12 is slowly advanced axially the length of the drum. The relative speeds of the drum and axial advance of the optical head are controlled by gears 16.

A 2 kc. oscillator 18 provides a signal used for two purposes. One output of the oscillator is used to control a two-phase 125 c.p.s. synchronous motor 20 which drives drum 10 through gears 22. This first output of oscillator 18 is fed into a limiting amplifier 24 and then into a 16:1 frequency divider 26 which supplies the frequency of 125 cycles per second. The 125 cycle current is fed through a 125 cycle filter and quadrature network 28 and into dual pre-amplifiers 30 and amplifiers 32 which drive motor 20 in phase synchronism with its input current.

A second output of oscillator 18 serves as a carrier and is fed directly into scanning head 12. As will be discussed more fully hereinafter, scannning head 12 includes means for sensing the printed image on the original document wrapped around drum 10 and modulating the oscillator in response to variations in the sensed printed pattern. Although it is possible to modulate the frequency of the oscillator, the present invention is more concerned with apparatus for modulating the amplitude of the oscillator's fixed frequency output or carrier. The modulated carrier is fed into pre-amplifier 33, amplifier 34 and loud-speaker transducer 36 where it is converted to an acoustic signal. The acoustic signal, with the help of an acoustic coupling cushion 38, is directed to the mouthpiece of a standard telephone handset 40 and is sent over the telephone circuit in the usual way that audible speech tones are transmitted by the telephone.

A transmit level indicator 42 is provided at the junction of amplifier 34 and speaker 36 for indicating the level of the amplitude modulated carrier. The level depends upon the strength of the signal output of optical head 12 which varies according to the light reflected from the white paper of the original and the intensity of light emitted from the lamp in the head. An adjustable lamp power supply 44 is provided for varying the lamp intensity to keep the level of the signal at the desired value for transmission regardless of the reflectivity of the original document.

FIG. 2 illustrates apparatus substantially identical to that of FIG. 1 except that the apparatus of FIG. 2 is in readiness to receive the acoustic signal, i.e., the modulated audio tone. The acoustic signal produced by the apparatus of FIG. 1 is transmitted in the usual way as for speech over normal telephone wires into the receiver of a standard handset 46. With the aid of an acoustic coupling cushion 48, the acoustic signal is directed into microphone 50 where it is reconverted into a 2 kc. modulated electrical signal and then amplified by pre-amplifier 52. The frequency and the amplitude of modulation of the received signal at the output of microphone pre-amplifier 52 are dependent upon and identical with the frequency and the modulation of the signal applied to loud-speaker transducer 36.

Pre-amplifier 52 produces two signals, one used for synchronism and the other for producing a copy of the original document. The first signal, from which a two-phase 125 cycle signal is derived, controls synchronous motor 53 used to rotate receiving drum 54. The other is fed through an array of circuits used for writing and consisting of modulation increaser 76, pre-amplifier 78 and stylus drive amplifier system 82 into stylus 56 on a screw 57 for axial movement relative to drum 54. Gears 58 are provided for determining the speed of advance of stylus 56 relative to the rotation of drum 54. Synchronous motor 53 drives drum 54 through gears 60. A sheet of electrosensitive receiving paper, typically Teledeltos paper, is wrapped around and secured to drum 54. Stylus 56 is traversed over the receiving paper in a helical pattern repeating the transmitting pattern of scanning head 12. The variations in the received modulated carrier are in accordance with the light and dark markings on the original. These are fed through the writing circuits into the stylus which reproduces the scanned image of the original in line-by-line facsimile on the electrosensitive receiving paper.

The output of pre-amplifier 52 used to drive motor 52 is fired fed into a limiting amplifier 62 and then through a 2 kc. filter 64 into a circuit array identical to that used to drive motor 20 in FIG. 1. This circuit array includes a second limiting amplifier 66, a 16:1 frequency divider 68, a 125 cycle filter and quadrature network 70, dual pre-amplifiers 70 and dual amplifiers 74. The synchronous motor 53 is driven in phase synchronism with its input signal, which is derived from the transmitted 2 kc. carrier and is therefore in synchronism with motor 20, which is also synchronized from the same 2 kc. source 18.

The other output of pre-amplifier 52 is fed into a non-linear modulation percentage increaser 76, which increases the percentage of modulation by a factor of approximately 10. This circuit, which will be described in detail hereinafter, increases the modulation percentage or index by clipping out the center section of the modulated 2 kc. carrier illustrated in FIG. 6*a* to produce the wave form shown in FIG. 6*b*. The output signal from circuit 76 is fed through pre-amplifier 78 and stylus drive amplifier system 82 into stylus 56. A contrast adjustment 84 is provided for varying the output of pre-amplifier 52 to control the level of the signals fed to the writing system circuits and ultimately to the stylus.

Figure 3:
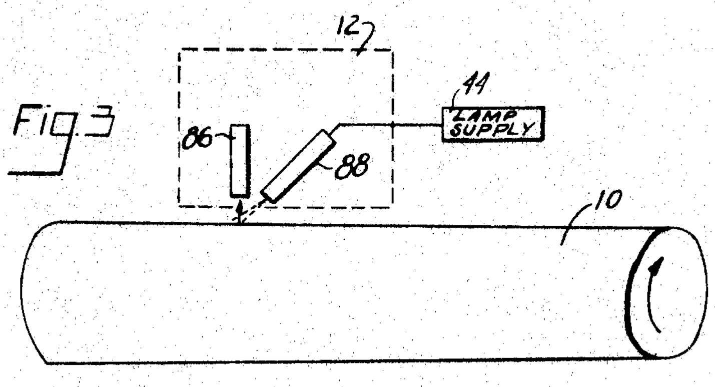
FIG. 3 is a schematic representation of components of the optical scanning system of FIG. 1.

As previously noted, scanning head 12 includes means for modulating the 2 kc. output of oscillator 18 before it is amplified and fed into speaker 36. As illustrated in FIG. 3, a semiconductor photodiode 86 and an incandescent lamp 88 powered by lamp supply 44 are provided in head 12. The light from the lamp is directed onto the document wrapped around drum 10 and reflected onto diode 86. The intensity of the reflected light is dependent upon the varies according to the light-reflecting properties of the illuminated portion of the document. If, for example, the document is an ordinary printed page, more light will be reflected from the white background portion of the page than from the drak printed image.

Figure 4:
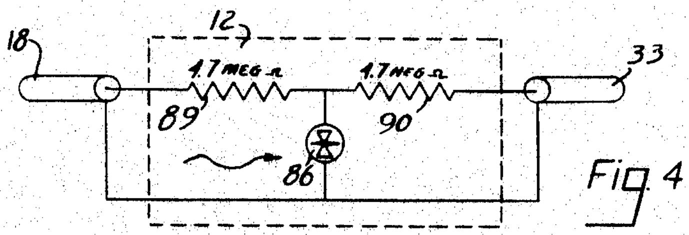
FIG. 4 is a schematic diagram of an electrical circuit used in conjunction with the apparatus of FIG. 3 for modulating the amplitude of the carrier.

The output of the 2 kc. oscillator 18 is amplitude modulated by the circuit shown in FIG. 4 which is contained within the scanning head 12. As illustrated, the configuration of the modulator is that of a T network where the series elements 89 and 90 are fixed resistances and the shunt element is formed by the photodiode 86. Photodiode 86 preferably is an N-P-N diffused silicon photoduodiode, although it should be evident that many other types of photosensitive elements could be used instead. The internal resistance of diode 86 varies in accordance with changes in the intensity of the reflected light incident upon it; the greater the intensity, the less the resistance. Typically, the resistance will vary from several megohms, when the light intensity is low, to a few tenths of a megohm when the light intensity is high. An increase in the light intensity causes a corresponding increase in the current flow through the photodiode and consequently reduces the amplitude of the output signal of the modulator. Lamp power supply 44 may be adjusted for any white background so that the minimum amplitude of the carrier output from the modulator will correspond to a predetermined level as read on the transmit level indicator.

Since the efficiency of the transmission system depends on the modulation index of the carrier, it is desirable that the index be as great as possible, i.e. near 100 percent. However, if the modulation index is too great, portions of the carrier will be too weak to produce the continuity of the 2 kc. signal above noise required to feed the circuits which drive motor 53 at the receiving station. The illustrated system is designed to have a modulation index of approximately 50 percent; i.e., minimum amplitude of the modulated carrier will be approximately 50 percent less than the amplitude of the basic carrier, and the maximum amplitude some 50 percent greater than the amplitude of the basic carrier. With an index of 50 percent, the amplitude will always be sufficiently great to develop the signal required for synchronizing motor 53 with the transmitter motor 20. Furthermore, 50 percent modulation insures that the transmission efficiency is high enough to obtain the required dynamic range of contrast in the received copy.

The operation of the modulating system is as follows: the 2 kc. carrier is fed into the modulator circuit at a level of approximately 2.5 volts peak-to-peak; a voltage division, the magnitude of which depends upon the internal resistance of diode 86, occurs between series resistance 89 and the diode; a second series resistor 90 isolates the midpoint of the network from the input loading of pre-amplifier 30 so that the full dynamic range of the modulator will be realized; and the modulated carrier or signal is fed from the scanning head into pre-amplifier 30. Although resistors 89 and 90 are both illustrated as having a value of 4.7 megohms, it should be recognized that their optimum value will depend, for example, on the resistance characteristics of the diode. In most cases it will be desirable that both resistors have substantially the same value.

The output signal of scanning head 12 is made into an audible tone by loud-speaker transducer 36 and transmitted over the telephone wires. As previously discussed, it is essential for the transmitting and receiving drums to rotate at the same rate of speed. In the illustrated apparatus both drums are driven by synchronous motors whose speed of rotation depends upon the frequency of the driving current. So long as the frequencies of the driving currents at the transmitting and receiving stations are the same, the drums will always rotate at perfectly synchronized speeds. In the illustrated embodiment synchronism is insured since the received acoustic signal is produced by and has the same frequency as the modulated carrier at the transmiting station. In alternative embodiments other standard frequency sources, such as suitably accurate 60 cycle house current, could be used.

Although a modulation index of approximately 50 percent provides an acoustic tone that can readily be transmitted and transformed back into an electrical modulated carrier, it is not sufficient, as transmitted and received, to directly present enough contrast in the received copy. It is therefore necessary to provide some means of increasing the modulation index of the signal fed into writing stylus 56 without decreasing the minimum amplitude of the transmitted carrier signal. This increase is accomplished by non-linear modulation increaser 76, shown schematically in FIG. 5, which is placed in the receiver writing circuit chain beyond the point where the synchronizing signal is picked off from pre-amplifier 52.

The operation of modulation increaser 76 is illustrated in FIGS. 6*a* and 6*b*. FIG. 6*a* represents the form of the amplitude modulated 2 kc. carrier signal as it is fed into increaser 76. In effect, increaser 76 "clips out" the center section of the carrier wave (the shaded area intermediate the horizontal dashed lines) and leaves a wave form similar to that shown in FIG. 6*b*. Points *a, b, c, d* and *e* and the wave form of FIG. 6*a* correspond to similarly lettered points on the wave form of FIG. 6*b*.

This center clipping is accomplished by solid-state diodes 92 and 94 in the schematic diagram of FIG. 5. Diodes 92 and 94 are connected so that one will work on the positive portion and one on the negative portion of the modulated signal. Each diode will conduct only when the absolute value of the input signal is large enough to overcome the cutoff bias voltage set by percentage increase adjustment 96. Percentage increase adjustment 96 establishes an A.C. supply voltage level in diode rectifiers 98 and 100 which in turn establish equal and opposite biasing voltages in the clipping diodes 92 and 94. The amplitude of the clipped-out center portion of the input signal, and hence the modulation index of the output signal from the modulation increaser, depends on the level of the bias established by increase adjustment 96 and diodes 98 and 100. Stylus drive amplifier system 82 is designed to achieve the maximum possible dynamic range with a given electrosensitive paper while providing maximum freedom from such extremes as "burning through" or irregular recording, caused by variations in the dynamic resistance of the recording paper. The dynamic resistance of electrosensitive paper of the type preferred for use with the present invention depends at least upon three major factors: the resistivity of the electrosensitive or "breakdown coating," the required breakdown or puncture voltage between the stylus and the base paper, and the resistivity of the base paper. Due to variations in manufacture, one or more of these may vary over a fairly large range. To insure a recording of the desired quality, it is necessary to insure that a given signal will always cause the same stylus-through-paper current irrespective of variations in the dynamic resistance of the paper. Since the present invention involves the use of an A.C. recording signal, it is also desirable from the standpoint of power efficiency that the impedance of the current source be matched to that of the paper. The amplifier system illustrated in FIG. 7 performs both of these functions by varying the input to matching transformer $T_2$ in response to changes in the dynamic resistance of the electrosensitive recording paper thereby insuring that the stylus-through-paper recording current will be linearly related to the amplitude of the input signal to the stylus drive amplifier irrespective of changes in the dynamic resistance of the paper.

The signal from pre-amplifier 78 is first fed into a PNP germanium transistor driver stage A. This stage is coupled to PNP germanium power transistors $A_2$ and $A_3$ by transformer $T_1$. The matching transformer $T_2$ is driven by transistors $A_2$ and $A_3$. The stylus and electrosensitive paper are connected in series with the secondary winding of matching transformer $T_2$ and any change in the dynamic resistance of the paper will cause a corresponding variation in the current flowing in the secondary of the transformer. Since the current flow in the primary and secondary windings of transformer $T_2$ are interdependent, a variation in paper resistance will also cause a change in the current flowing in the primary. It is therefore possible to sense changes in the dynamic resistance of the electrosensitive paper by sampling the current flowing in either winding of the matching transformer. If these sensed changes are fed back negatively into an early portion of the amplifier driving the transformer, its over-all gain will be automatically adjusted to compensate for variations in the dynamic resistance of the paper.

In the illustrated apparatus a current sampling resistor is provided in series with the return of the secondary winding of transformer $T_2$. Alternatively, a sampling resistor of appropriate value could be provided in series with the return of the primary winding. In the present apparatus, which uses an A.C. recording signal, either arrangement is acceptable. The voltage with respect to ground at the junction of sampling resistor $R_1$ and one side of the secondary of transformer $T_2$ is fed back to the junction of the emitter of transistor $A_1$ and its 33 ohm resistor through series resistor $R_2$. This feedback loop is negative and automatically controls the gain of the amplifier, and hence the current flow into and out of transformer $T_2$, in response to changes in the dynamic resistance of the electrosensitive paper and causes the stylus-to-paper driving system to be of the constant current type. The magnitude of the current flowing through the recording paper is then independent of the paper resistance and is linearly related to the amplitude of the input signal to the stylus drive amplifier system.

Since certain changes may be made in the above apparatus and method without departing from the scope of the invention herein involved, it is intended that all matter contained in the above description or shown in the accompanying drawings shall be interpreted as illustrative and not in a limiting sense.

I claim:

1. The method of transmitting facsimile data comprising the steps of: modulating the amplitude of a carrier wave in response to the sensed variations in the image of an original document; transforming the modulated portion of the carrier wave into an amplitude modulated acoustic tone; transmitting the modulated acoustic tone to a receiving station; transforming the received modulated acoustic tone into a received modulated carrier wave; increasing the modulation index of the received carrier wave and then using the increased modulation wave to provide a recording current to reproduce a copy of the original document on electrosensitive receiving paper.

2. The method of transmitting facsimile data comprising the steps of: producing a carrier wave; splitting the wave into two portions; using the first portion to drive a synchronous motor having a driving connection with a drum on which an original document is mounted and scanned in phase synchronism with the carrier wave; modulating the amplitude of the second portion of the carrier wave in response to the sensed variations in the image of the original document; transforming the modulated second portion of the carrier wave into a modulated acoustic tone; transmitting the modulated acoustic tone to a receiving station; transforming the received modulation acoustic tone into a received modulated carrier wave having the same frequency as the original carrier wave, splitting the received carrier into two portions; increasing the modulation index of one portion of the received wave by clipping a predetermined amplitude out of the center of the one portion; using the increased modulation portion to provide a recording current to reproduce a copy of the original document on electrosensitive receiving paper; and, using the other portion of the received carrier to drive in phase synchronism with the received carrier wave a second synchronous motor having a driving connection with a drum on which the receiving paper is mounted.

3. The method of transmitting facsimile data comprising the steps of: producing a carrier wave; splitting the wave into two portions; using the first portion of the carrier wave to drive a synchronous motor having a driving connection with a drum on which an original document is mounted and scanned in phase synchronism with the carrier wave; modulating the amplitude of the second portion of the carrier wave in response to the sensed variations in the image of the original document; transforming the modulated second portion of the carrier wave into a modulated acoustic tone; transmitting the modulated acoustic tone to a receiving station; transforming the received modulated acoustic tone into a received modulated carrier wave having the same frequency as the original carrier wave; splitting the received carrier into two portions; using the one portion of the received carrier to drive a second synchronous motor having a driving connection with a drum on which the receiving paper is mounted in phase synchronism with the received carrier wave; increasing the modulation index of the other portion of the received carrier; using the other portion to provide a recording current for producing a copy of the original document on electrosensitive receiving paper; and, varying the recording current in response to changes in the resistance of the electrosensitive recording paper.

4. In a facsimile transmission system having a cylindrical drum mounted for rotation about its axis and a writing stylus mounted adjacent the drum for axial movement relative thereto at a rate having a fixed relationship to the speed of rotation thereof for reproducing a copy of an original document on an electrosensitive receiving paper wrapped around the drum, in combination:

- acoustic means for transforming a received, amplitude modulated acoustic tone into a modulated electrical carrier having a frequency predeterminedly related to that of the acoustic tone; and
- a modulation increaser coupled with the acoustc means for increasing the modulation index of the received carrier.

5. The system of claim 4 wherein said modulation increaser clips a predetermined amplitude out of the center of said carrier.

6. In facsimile apparatus operative in a transmit mode for producing an acoustic signal representative of facsimile data and in a receiving mode for receiving an acoustic signal and producing a copy of an original document and including a cylindrical drum mounted for rotation about its axis, a scanning head mounted adjacent the drum for axial movement relative thereto at a speed having a fixed relationship to the speed of rotation thereof for sensing variations in the intensity of the light reflected from an illuminated portion of an original document wrapped around the transmitting drum, and a writing stylus mounted adjacent the drum for axial movement relative thereto at a speed having a fixed relationship to the speed of rotation thereof for reproducing a copy of an original document on an electrosensitive paper wrapped around the drum, in combination:

- a modulating circuit comprising a T-network having a photoconductive device as a shunt element for modulating the amplitude of a carrier wave in response to variations in the intensity of the reflected light incident on the photoconductive device;
- transmitting acoustic means including a transducer coupled with the modulating circuit for transforming the modulated carrier wave into a modulated acoustic tone;
- receiving acoustic means for transforming a transmitted acoustic tone into a received modulated electrical carrier; and
- a modulation increaser coupled with the receiving acoustic means for increasing the modulation index of the received carrier by clipping a predetermined amplitude out of the center of the received carrier.
- said modulating circuit and said transmitting acoustic means being operative in said transmit mode and said receiving acoustic means and said modulation increaser being operative in said receiving mode.

7. In a facsimile transmission system having a cylindrical drum mounted for rotation about its axis and a scanning head mounted adjacent the drum for axial movement relative thereto at a rate having a fixed relationship to the speed of rotation thereof to sense variations in the intensity of light reflected from an illuminated portion of an original document wrapped around the drum, in combination:

- apparatus for producing a carrier wave having a predetermined frequency;
- a motor drive circuit coupled with the carrier producing apparatus and with a synchronous motor having a driving relation with the drum for driving the motor in phase synchronization with a first portion of the carrier wave;
- a modulating circuit comprising a T-network having a photoconductive device mounted on the scanning head as a shunt element and coupled with the carrier producing apparatus for modulating the amplitude of a second portion of the carrier wave in response to variations in the intensity of the reflected light incident on the photoconductive device; and
- acoustic means coupled with the modulating circuit for transforming the modulated second portion of the carrier wave into a modulated acoustic tone.

8. In a facsimile transmission system having a cylindrical drum mounted for rotation about its axis and a writing stylus mounted adjacent the drum for axial movement relative thereto at a rate having a fixed relationship to the speed of rotation for reproducing a copy of an original document on an electrosensitive receiving paper wrapped around the drum, in combination:

- acoustic means for transforming a received amplitude modulated acoustic tone into a modulated electrical carrier having a frequency predeterminedly related to that of the acoustic tone;
- a motor drive circuit coupled with the acoustic means and with a synchronous motor having a driving connection with the drum for actuating the motor in response to a first portion of the carrier;
- a modulation increaser for increasing the modulation index of the second portion of the carrier; and,
- stylus drive means coupled with the modulation increaser and the stylus for transforming the output from the modulation increaser into a recording current and applying the recording current to the stylus to reproduce a copy of the original document.

9. The system of claim 8 wherein said modulation increaser clips a predetermined amplitude out of the center of said second portion and including apparatus coupled with the modulation increaser and the stylus for maintaining a linear relationship between the output of the modulation increaser and the recording current.

10. For a facsimile transmission system having a scanning head mounted for movement relative to an original document and apparatus for producing an electrical carrier;

a modulator adapted for coupling with the carrier producing apparatus for modulating the amplitude of the carrier in response to variations in the intensity of light reflected from an illuminated portion of the document, said modulator comprising:

a photoconductive device for sensing the intensity of the light reflected from an illuminated portion of the document and incident on the photoconductive device; and a modulating circuit comprising a T-network having the photoconductive device as a shunt element.

11. The system of claim 10 wherein said T-network is substantially symmetrical.

12. The system of claim 10 wherein said photoconductive device is a photoduodiode.

13. In a facsimile transmission system in which an amplitude modulated signal is used to reproduce a copy of an original document, the combination therewith of a modulation increaser for clipping a predetermined amplitude out of the center of the signal to increase the modulation index of the signal.

14. The system of claim 13 wherein said modulation increaser comprises a pair of diodes connected in opposite sense and means for applying bias voltages thereto.

15. The system of claim 13 wherein the output of the modulation increaser is transformed into a recording current and the current applied to a writing stylus to reproduce a copy of an original document on electrosensitive paper, said system including apparatus coupled with the modulation increaser for maintaining a linear relationship between the amplitude of the output of the modulation increaser and the recording current independent of variations in the resistance of the electrosensitive paper.

References Cited

UNITED STATES PATENTS

| | | | |
|---|---|---|---|
| 2,217,157 | 10/1940 | Cooley | 178—6.6 |
| 2,846,500 | 8/1958 | Neeb | 178—6.6 |
| 2,903,517 | 9/1959 | Ridings | 179—4 |
| 3,325,818 | 6/1967 | Nakagawa | 178—6.6 |

ROBERT L. GRIFFIN, *Primary Examiner.*

JOHN W. CALDWELL, *Examiner.*

H. W. BRITTON, *Assistant Examiner.*